US006915388B1

(12) United States Patent
Huffman

(10) Patent No.: US 6,915,388 B1
(45) Date of Patent: Jul. 5, 2005

(54) METHOD AND SYSTEM FOR EFFICIENT USE OF A MULTI-DIMENSIONAL SHARING VECTOR IN A COMPUTER SYSTEM

(75) Inventor: William A. Huffman, Los Gatos, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 795 days.

(21) Appl. No.: 09/910,630

(22) Filed: Jul. 20, 2001

Related U.S. Application Data

(60) Provisional application No. 60/219,944, filed on Jul. 20, 2000.

(51) Int. Cl.[7] ............................................. G06F 12/06
(52) U.S. Cl. ......................... 711/145; 711/207; 712/16
(58) Field of Search ................................. 711/141, 144, 711/145, 207, 128, 202, 206; 712/16

(56) References Cited

U.S. PATENT DOCUMENTS

| | | | | |
|---|---|---|---|---|
| 5,367,692 A | * | 11/1994 | Edelman ...................... | 712/22 |
| 5,596,704 A | * | 1/1997 | Geddes et al. .............. | 715/763 |
| 5,634,110 A | * | 5/1997 | Laudon et al. .............. | 711/145 |
| 5,900,015 A | * | 5/1999 | Herger et al. ............... | 711/141 |
| 6,633,958 B1 | * | 10/2003 | Passint et al. .............. | 711/141 |
| 6,718,442 | * | 4/2004 | Huffman et al. ............ | 711/141 |

OTHER PUBLICATIONS

Kaplow et al, "Run–Time Reference Clustering for Cache performance Optimization", IEEE Proceeding on Parallel Algorithms, Mar. 1997.*
Sterling et al., "Gilgamesh: A Multithreaded Processor–In–Memory Architecture for Petaflops Computing", http://sc–2002.org/paperpdfs/pap.pap105.pdf.*

* cited by examiner

*Primary Examiner*—Pierre-Michel Bataille
(74) *Attorney, Agent, or Firm*—Baker Botts L.L.P.

(57) ABSTRACT

A multiprocessor computer system includes a plurality of processor nodes, a memory, and an interconnect network connecting the plurality of processor nodes to the memory. The memory includes a plurality of lines and a cache coherence directory structure. The plurality of lines includes a first line. The cache coherence directory structure includes a plurality of directory structure entries. Each directory structure entry includes processor pointer information indicating the processor nodes that have cached copies of the first line. The processor pointer information includes a plurality n of bit vectors, where n is an integer greater than one. The n bit vectors define a matrix having a number of locations equal to the product of the number of bits in each of the n bit vectors. The number of locations is greater than the number of processor nodes and each of the processor nodes is mapped to a corresponding one of the locations wherein the locations corresponding to the processor nodes are dispersed in the matrix in an at least partially noncontiguous manner.

20 Claims, 7 Drawing Sheets

| NODE | HEX NOTATION | CORRESPONDING N BIT SETTINGS | | |
|---|---|---|---|---|
| | | | SECOND LEAST SIGNIFICANT BIT | LEAST SIGNIFICANT BIT |
| | | 7 | 6 5 4 | 3 2 1 0 |
| 0 | 0x00 | 0 | 0 0 0 | 0 0 0 0 |
| 19 | 0x19 | 0 | 0 0 1 | 1 0 0 1 |

| NODE | SHARING MODE 11 | | | | | |
|---|---|---|---|---|---|---|
| | PLANE N7 | ROW N6,N5,N4 | COLUMN N3:N0 | PLANE | ROW | COLUMN |
| 0 | 0 | 0 0 0 | 0 0 0 0 | 0 | 0 | 0 |
| 19 | 0 | 0 0 1 | 1 0 0 1 | 0 | 1 | 9 |

| NODE | SHARING MODE 10 | | | | | |
|---|---|---|---|---|---|---|
| | PLANE N6 | ROW N6⊕N3,N5,N4 | COLUMN N3:N0 | PLANE | ROW | COLUMN |
| 0 | 0 | 0 0 0 | 0 0 0 0 | 0 | 0 | 0 |
| 19 | 0 | 1 0 1 | 1 0 0 1 | 0 | 5 | 9 |

METHOD AND SYSTEM FOR EFFICIENT USE OF A MULTI-DIMENSIONAL SHARING VECTOR IN A COMPUTER SYSTEM

RELATED APPLICATIONS

This application claims the benefit of U.S. Provisional Application Ser. No. 60/219,944 filed Jul. 20, 2000.

TECHNICAL FIELD OF THE INVENTION

The present invention relates in general to memory access control in microprocessors, and more particularly to a directory structure for efficiently maintaining cache coherency.

BACKGROUND OF THE INVENTION

In a shared-memory multiprocessor computer system with per-processor caches, it is desirable for hardware to keep the caches coherent. This means that when one or more processors have a copy of a block or line of memory and one of the processors performs a write to that line, the cached copies must either be updated or invalidated.

There are two basic mechanisms for doing this. One is to have all processors "snoop" on all write operations in the system and invalidate or update their own copies when appropriate. This is called "snoopy" coherence or "snooping caches", and is generally done in shared-bus multiprocessors.

The other alternative is to use directories that are associated with main memory. In large systems, memory, and thus the directories, may be physically distributed among the machine. The directory associated with a region of memory keeps track of which processors, if any, have copies of memory lines in that region. When a write occurs to a line, the directory is consulted, and updates or invalidates are sent to any processors that have a copy of the line. In this way, processors are relieved from having to snoop on all memory write traffic.

The basic problem with directories is that the required storage does not scale well. The canonical directory structure associates a directory entry with every line of main memory. Each directory entry consists of some state, along with a bit vector (one bit per processor in the system) indicating which processor(s) currently have a copy of the line. As the number of processors is increased, the number of lines for which directory information is needed grows linearly. In addition, the size of the directory entries also grows linearly. The net result is that the total amount of storage needed for the directories grows as the square of the number of processors, becoming prohibitively expensive for large systems.

There are a number of ways to reduce directory overhead. One way is to reduce the number of directory entries by noting that, since caches are much smaller than main memory, most memory lines will not be cached by any processor at any given time. Thus, the size of the directories are reduced, and the directory is managed as a cache. Any line for which a directory entry cannot be found is assumed to be in the uncached state.

Another way to reduce directory overhead is to limit the size of the directory entries such that an entry cannot represent any arbitrary set of processors in the system. The system is then either prohibited from allowing non-representable sets of processors to cache a line concurrently, (by, say, invalidating the copies of certain processors when other processors obtain a copy of the line), or, more preferably, when a non-representable set of sharing processors occurs, the directory entry is set to represent some superset of the sharing processors. Then when the line is written, an invalidation or update message is sent to the superset of processors caching the line.

The two approaches are orthogonal. That is, use of both approaches in tandem should result in a greater reduction in directory overhead than can be achieved with either one by itself.

In the following discussion and throughout this patent specification, for convenience an invalidate-based coherence protocol is assumed, although the approach is equally applicable to an update-based protocol. A goal of a directory structure for a large multiprocessor system is to use a modest number of bits in a directory entry, yet minimize the number of "spurious" invalidation messages that must be sent when a line is written. That is, keep the superset as close to the size of the actual set of sharers as possible.

At one end of the spectrum is a full broadcast mechanism. In this scheme, as soon as a line becomes cached by any processor (or perhaps only when it is cached by more than one processor), the state of the corresponding directory is set to indicate that a broadcast is necessary. When the line is written, invalidations are sent to all processors in the system. This mechanism minimizes the number of bits needed in the directory entry, but maximizes spurious invalidations. The performance of this scheme is very poor for large systems.

At the other end of the spectrum is the full bit-vector mechanism described above, in which a directory entry includes a bit for each processor in the system. This maximizes directory storage overhead, but eliminates spurious invalidations. The storage overhead for this scheme is unacceptable for large systems.

A reasonable middle ground is a "coarse-vector" directory structure like the one used in the Origin 2000 manufactured by Silicon Graphics In. of Mountain View, Calif. The directory structure in the Origin 2000 includes a bit vector of size v in the directory entries (where v=32). Each bit represents one or more processor nodes in the system. For systems with thirty-two or fewer nodes, this size bit vector acts like a full bit vector. For larger numbers of nodes, however, the vector can become "coarse". When the set of processor nodes sharing a line is contained within an aligned block of consecutive processor nodes, then the bit vector can still be used as a full bit vector, with another small field in the directory entry specifying the block of processor nodes the vector represents. Processor nodes will typically contain one or more processors. In the Origin 2000, each processor node includes two processors.

When the set of processor nodes expands beyond an aligned block of v processor nodes, however, the meaning of the bits in the vector is changed (this is recorded in the state information in the entry). For N-processor-node systems, each bit in the vector now represents N/v processor nodes. For example, in a 512-processor node system with a 32-bit vector, each bit in the vector represents sixteen processor nodes. For every processor node caching the line, the bit representing the set of processor nodes containing that processor node would be set. When the line is written, for each bit that is set in the coarse vector, invalidation messages are sent to the corresponding set of N/v processor nodes. In most cases, this will cause invalidations to be sent to some processor nodes that do not have a copy of the line (spurious invalidates). However, the number of spurious invalidates will generally be much fewer than would be sent with the full broadcast mechanism.

Such an approach is effective in reducing the size of each directory entry. Such an approach does, however, continue to scale linearly as the number of processors in the system increases.

A better way of compacting directory entries, in contrast to the single bit vector approach discussed above, is a multi-dimensional directory structure approach which uses two or more bit vectors to track each processor node. Such an approach is described in U.S. patent application Ser. No. 08/971,184, filed Nov. 17, 1997, now pending, entitled Multi-Dimensional Cache Coherence Directory Structure, the disclosure of which is incorporated herein by reference. In the multi-dimensional approach, each processor node is represented by a bit in each of the two or more bit vectors.

For example, a two-dimensional directory structure includes two or more entries. Each entry includes a row vector such as an r-bit vector (where r is an integer greater than one) and a column vector such as a c-bit vector (where c is an integer greater than one). Each intersection of a row and a column represents a node that may have one or more processors. More generally, for a system with n vectors, as each processor obtains a copy of a shared line, the bits corresponding to that processor are set in each of the n vectors of the associated directory entry. If n-1 of the vectors have only a single bit set, then the pointer information remains exact. If more than one bit is set in at least two of the fields, however, then the pointer information can become inexact, or approximate.

As a result, in addition to invalidation messages being sent to shared processor nodes needing the messages, spurious invalidation messages are sent to alias processor nodes not needing the messages.

SUMMARY OF THE INVENTION

From the foregoing, it may be appreciated that a need has arisen for a technique to handle the situation where the pointer information becomes inexact. Such a technique is needed to reduce the number of spurious invalidation messages. In accordance with the present invention, a method and system for efficiently using a multi-dimensional sharing vector in a computer system are provided that substantially eliminate or reduce disadvantages and problems associated with conventional computer systems.

According to an embodiment of the present invention there is provided a multiprocessor computer system that includes a plurality of processor nodes, a memory, and an interconnect network connecting the plurality of processor nodes to the memory. The memory includes a plurality of lines and a cache coherence directory structure. The plurality of lines includes a first line. The cache coherence directory structure includes a plurality of directory structure entries. Each directory structure entry includes processor pointer information indicating the processor nodes that have cached copies of the first line. The processor pointer information includes a plurality n of bit vectors, where n is an integer greater than one. The n bit vectors define a matrix having a number of locations equal to the product of the number of bits in each of the n bit vectors. The number of locations is greater than the number of processor nodes and each of the processor nodes is mapped to a corresponding one of the locations wherein the locations corresponding to the processor nodes are dispersed in the matrix in an at least partially noncontiguous manner.

In a further aspect of the present invention, each of the processor nodes is assigned a corresponding processor number. Each processor number is expressed as n sets of bits such that the n sets of bits do not overlap. Further, each processor node includes a plurality of processors.

In another aspect of the present invention, where each processor node is assigned a processor number, the processor number is expressed as a function of a first and a second set of bits and the n bit vectors include a first and a second bit vector. The first set of bits of the processor number are mapped into the first bit vector and the second bit vector is a function of at least a subset of the first set of bits of the processor number and at least a subset of the second set of bits of the processor number. The n bit vectors include a third bit vector which is a function of at least a subset of the second set of bits of the processor number.

In a further aspect of the present invention, at least one bit of the second bit vector is a function of a bit from the third bit vector and a bit from the first bit vector.

In another aspect of the invention, the bit of the second bit vector is determined by an exclusive or (XOR) operation of the bit from the third bit vector and the bit from the first bit vector.

In another aspect of the present invention, the system includes a bit mode field configured to set a functional relationship between the bits of the processor node number and the bits of the n bit vectors.

In another aspect of the present invention, the computer system includes a plurality of processor nodes; a memory, wherein the memory includes a plurality of lines and a cache coherence directory structure, wherein the plurality of lines includes a first line and wherein the cache coherence directory structure includes a plurality of directory structure entries; and an interconnect network connecting the plurality of processor nodes to the memory. Each of the processor nodes is assigned a corresponding processor number, wherein the processor number is defined by a four bit N0, N1, N2, N3 subfield of a seven bit field and a three bit N4, N5, N6 subfield of the seven bit field, where the four and three bit subfields do not overlap and where the bits are ordered such that N0 is a least significant bit and N6 is a most significant bit of the seven bit field. Each directory structure entry includes processor pointer information indicating the processor nodes that have cached copies of the first line. The processor pointer information includes a first bit vector which includes sixteen bits, a second bit vector which includes eight bits and a third bit vector which includes two bits. The first bit vector is defined by bits N0, N1, N2 and N3. When the number of processor nodes is between one and thirty-two, the second bit vector is defined by N3, N2 and the result of an XOR operation between N4 and N1; and the third bit vector is defined by N4. When the number of processor nodes is between thirty-three and sixty-four, the second bit vector is defined by N3, the result of an XOR operation between N5 and N2, and N4, and the third bit vector is defined by N5. When the number of processor nodes is between sixty-five and 128, the second bit vector is defined by the result of an XOR operation between N6 and N3, N5, and N4, and the third bit vector is defined by N6. When the number of processor nodes is between 129 and 256, the processor number is defined by an eight bit field which includes the seven bit field and an additional bit N7, the second bit vector is defined by N6, N5 and N4, and the third bit vector is defined by N7. A sharing mode field is configured to define a range of the number of processor nodes. A first range has between one and thirty-two processor nodes, a second range has between thirty-three and sixty-four processor nodes, a third range has between sixty-five and 128 processor nodes and a fourth range has between 129 and 256 processor nodes.

In another aspect of the present invention, a method is provided of maintaining cache coherency across a computer system having a plurality of processor nodes, including a first and a second processor node, wherein each of the plurality of processor nodes includes a cache. The method includes assigning a processor number to each of the plurality of processor nodes. The method further includes defining a plurality of bit vectors, wherein each processor node is represented by a bit in each of the plurality of bit vectors. The method includes defining a matrix from the plurality of bit vectors wherein the matrix has a plurality of potential node locations and wherein the number of potential node locations is greater than the number of processor nodes. Further each processor number is mapped to a corresponding potential node location defining an actual node location. The actual node locations corresponding to the processor numbers are dispersed in the matrix in an at least partially noncontiguous manner. A first memory location in memory is determined. The method further includes reading a line from the first memory location into the cache of said first processor node. The step of reading includes the step of setting a bit in each of the plurality of bit vectors as a function of the processor number assigned to the first processor node defining a first actual node location of the actual node locations. A line from the first memory location is read into the cache of said second processor node. The step of reading includes the step of setting a bit in each of the plurality of bit vectors as function of the processor number assigned to the second processor node defining a second actual node location of the actual node locations. The method includes writing to the first memory location. The step of writing includes the steps of determining, as a function of bits set in the bit vectors, processor nodes holding a copy of the line and sending a message to the processor nodes determined in the first step indicating that the line read from the first location is no longer valid.

In another aspect of the present invention, a method of maintaining cache coherency across a computer system is provided including mapping a first set of bits from the processor number into a first bit vector of the plurality of bit vectors and mapping at least a subset of the first set of bits from the processor number and at least a subset from a second set of bits from the processor number into a second bit vector of the plurality of bit vectors. Additional steps include determining at least one bit of the second bit vector as a function of a bit from the third bit vector and a bit from the first bit vector; mapping a first set of bits from the processor number into a first bit vector of the plurality of bit vectors; determining the bit of the second bit vector by an exclosuve or (XOR) operation of the bit from the third bit vector and the bit from the first bit vector; and setting a functional relationship between the bits of the processor number and the bits of the plurality of the bit vectors based on the number of processor nodes in the computer system.

In a further aspect of the present invention, the first bit vector is an N-to-$2^N$ mapping of the N least significant bits of the processor number; the second bit vector is an M-to-$2^M$ mapping of bits (M+N−1) through N of the processor number; and the third bit vector is a P-to-$2^P$ mapping of bits (P+M+N−1) through M+N of the processor number.

In another aspect of the present invention, M=4, N=3 and P=2. The processor number is defined by an eight bit number N0, N1, N2, N3, N4, N5, N6, and N7. The first bit vector is defined by bits N0, N1, N2 and N3. When the number of processor nodes is between one and thirty-two, the second bit vector is defined by N3, N2 and the result of an XOR operation between N4 and N1; and the third bit vector is defined by N4. When the number of processor nodes is between thirty-three and sixty-four, the second bit vector is defined by N3, the result of an XOR operation between N5 and N2, and N4, and the third bit vector is defined by N5. When the number of processor nodes is between sixty-five and 128, the second bit vector is defined by the result of an XOR operation between N6 and N3, N5, and N4, and the third bit vector is defined by N6. When the number of processor nodes is between 129 and 256, the processor number is defined by an eight bit field which includes the seven bit field and an additional bit N7, the second bit vector is defined by N6, N5 and N4, and the third bit vector is defined by N7.

Other technical advantages may be readily apparent to those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
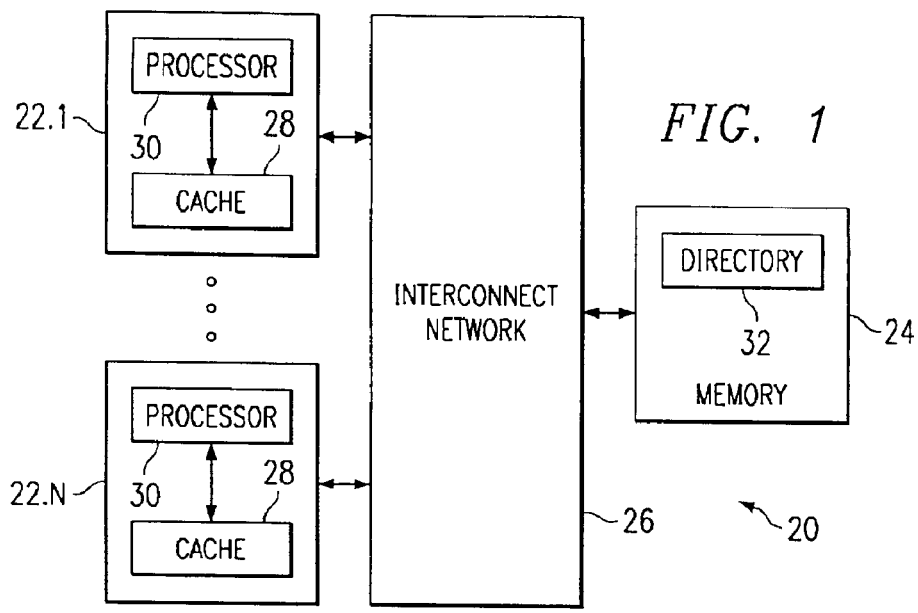
FIG. 1 illustrates a multiprocessor system having a multi-dimensional cache coherence directory structure.

A multiprocessor system 20 is shown in FIG. 1. In FIG. 1, a plurality of processor nodes 22.1 through 22.N are connected to a memory 24 by an interconnect network 26. Each processor node 22 includes a cache 28 and at least one processor 30. Network 26 can be implemented as any version of interconnect network, from a bus to a hypercube or mesh architecture. Memory 24 may be distributed or centralized memory. In one distributed memory embodiment, memory 24 is implemented as sections of local memory placed in close proximity to each of processor nodes 22.1 through 22.N. In another distributed memory embodiment, memory 24 is distributed as sections of memory which are physically separate from processor nodes 22.1 through 22.N.

A directory structure 32 resident in memory 24 is used to monitor cache coherence. In one such embodiment, directory structure 32 is maintained in nonvolatile memory within memory 24.

In contrast to the single bit vector approach, in a multi-dimensional approach directory structure 32 uses two or more bit vectors to track each processor node 22. That is, each processor node 22 is represented by a bit in each of the two or more bit vectors. For simplicity each description will be made in terms of a system in which processor numbers are assigned to each processor. It should be obvious that such a system can also be extended to cover systems in which processor numbers are assigned to processor nodes and each node has two or more processors.

Figure 2:
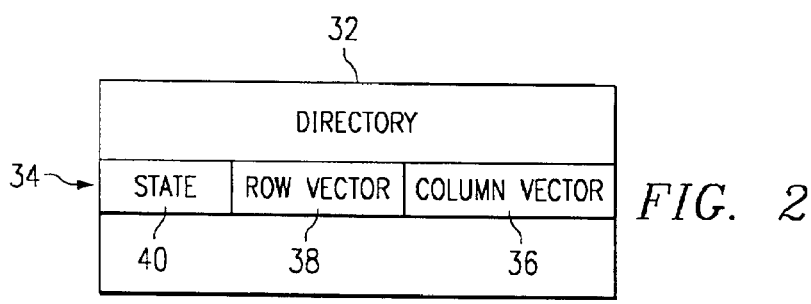
FIG. 2 illustrates an embodiment of a two-dimensional directory structure which can be used according to the present invention.

FIG. 2 shows one embodiment of a two-dimensional cache coherence directory structure in which directory structure 32 includes two or more entries 34. Each entry 34 includes a column vector 36 and a row vector 38. Column vector 36 is a c-bit vector (where c is an integer greater than one). Row vector 38 is an r-bit vector (where r is an integer greater than one). In one such embodiment, each entry 34 includes a state indicator 40 which specifies whether the line is cached by a single processor or multiple processors, and how the rest of the directory entry should be interpreted (i.e., the mode of directory entry 34).

Figure 3:
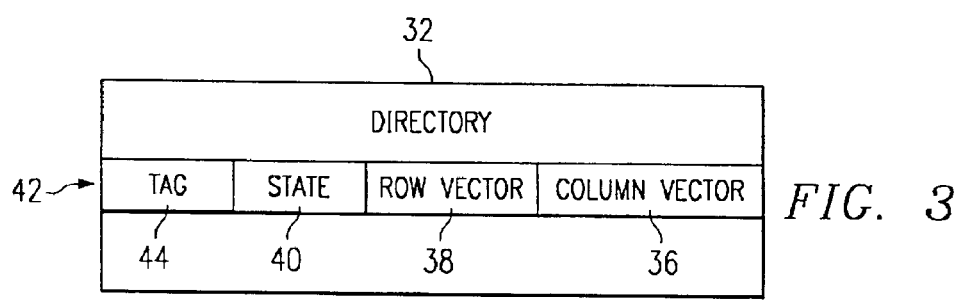
FIG. 3 illustrates another embodiment of a two-dimensional directory structure which can be used according to the present invention.

FIG. 3 shows another embodiment of a two-dimensional cache coherence directory structure. In FIG. 3 directory structure 34 includes a set of entries 42. Each entry 42 includes a tag field 44, a state indicator 40, a column vector 36 and a row vector 38. Once again, column vector 36 is a c-bit vector (where c is an integer grater than one). Row vector 38 is an r-bit vector (where r is an integer greater than one). In the embodiment shown in FIG. 3, each entry 42 includes a state indicator 40 which specifies whether the line is cached by a single processor or multiple processors, and how the rest of the directory entry should be interpreted (i.e., the mode of directory entry 42). In addition, in cases where the directory is managed as a cache, the tag field 44 is used to specify the line to which the directory entry 42 refers. (Note: In directories 32 which provide a directory entry for every line of memory, there is no need for a tag field 44; this information is implied by the position of entry 42 within directory structure 32.)

In one embodiment, directory structure 32 is an n-dimensional structure in which each entry 46 includes a state indicator 48 and n bit pointer vectors (V0, V1, ..., Vn), each a power of two in length (L0, L1, Ln). One such embodiment is shown in FIG. 4.

Figure 4:
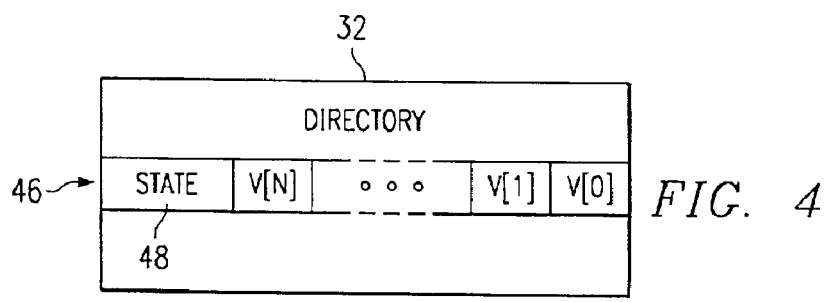
FIG. 4 illustrates an embodiment of an n-dimensional directory structure which can be used according to the present invention.

In the embodiment shown in FIG. 4, a given processor in the system is represented by a bit in each one of the pointer vectors. In one embodiment, the bit set in V0 is determined by a decode of the low-order log (L0) bits of the processor number. The bit set in V1 is determined by the next log (L1) bits of the processor number, and so on.

Figure 5:
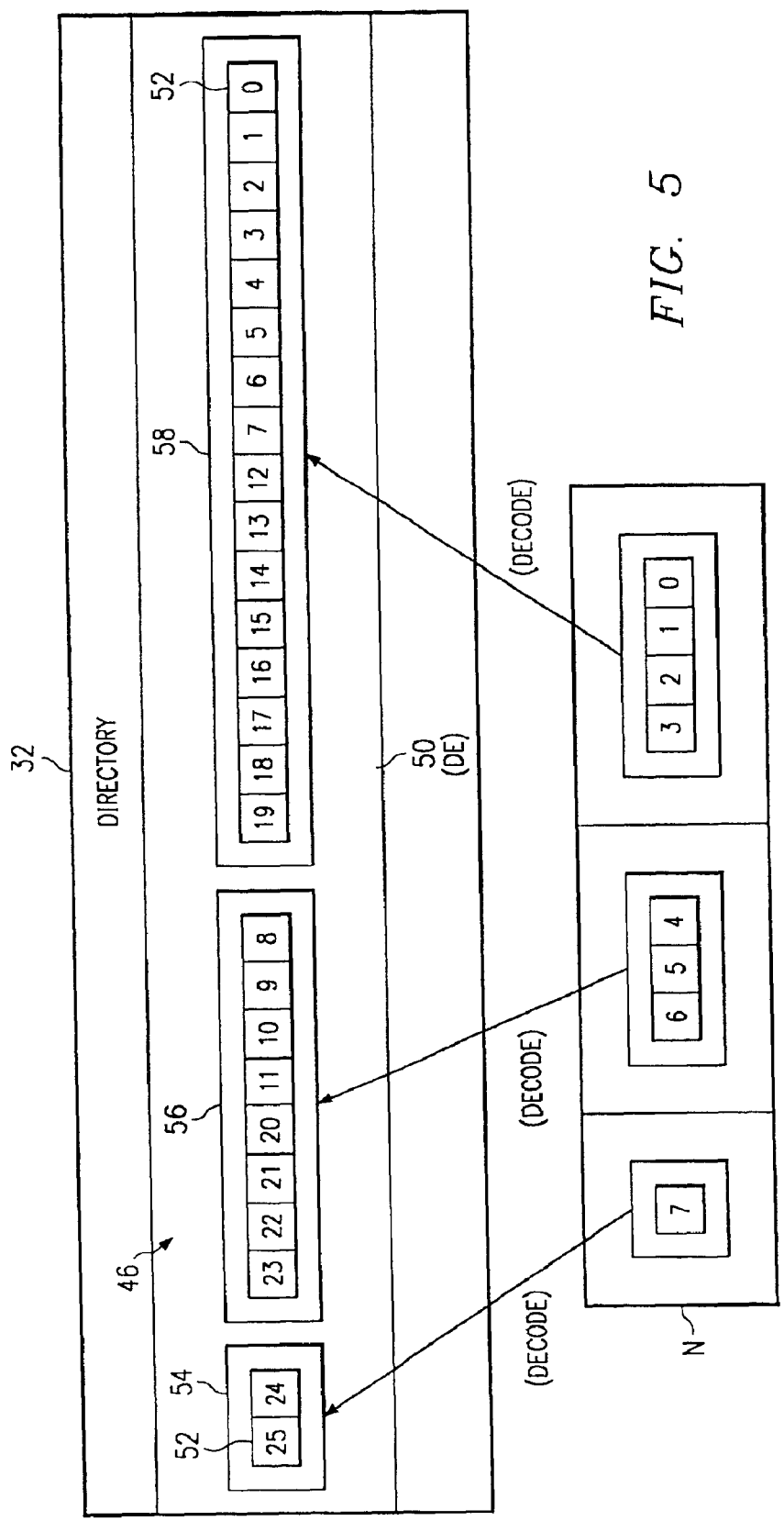
FIG. 5 illustrates one embodiment of a processor node number mapping into a three-dimensional directory structure which can be used according to the present invention.
Figure 6:
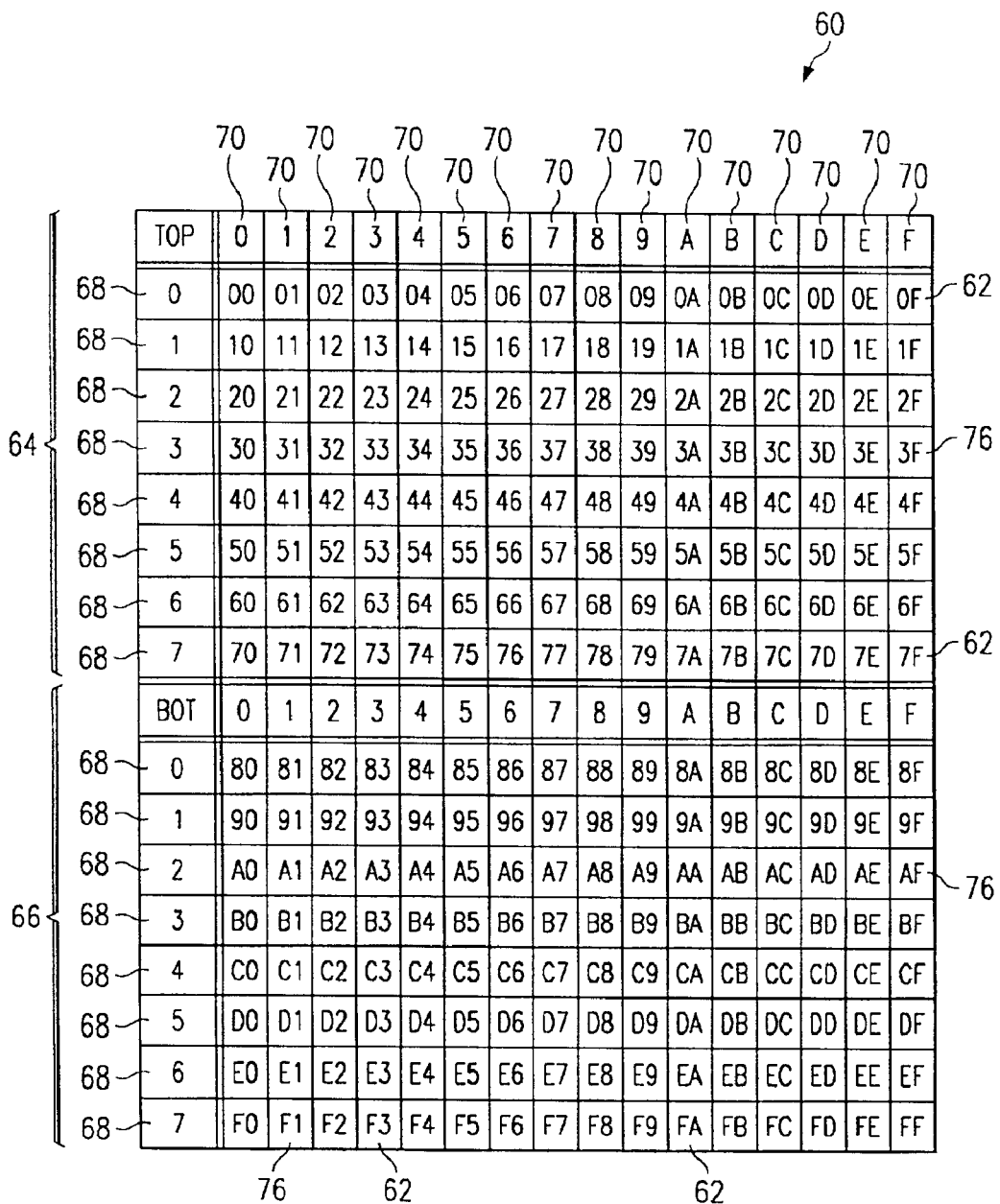
FIG. 6 is a matrix illustrating the location of nodes in a 256 node system which can be used according to the present invention.

In FIG. 5 as an example, a sharing vector 50 having a twenty-six bit construct takes up all the bits in the directory entry 46. Using 26 bits to represent up to 256 nodes as opposed to using a 256-bit vector is the difference between using 1/32 of memory versus 1/4 of memory. The state for other, non-shared, situations is entirely fit into one quarter of the representation space. In this example, the first two bits of the sharing vector are never both zero and two zeros there are used to provide space for all the other states. The twenty-six bits 52 of the sharing vector 50 are divided into three fields corresponding to three vectors. The three bit vectors are a two-bit vector DE[25:24] 54; an eight-bit vector DE[23:20,11:8] 56; and a sixteen-bit vector DE[19:12,7:0] 58, where "DE" stands for directory entry and the numbers inside the brackets indicate the bit positions within the directory entry. The eight-bit vector 56 is also referred to as Shr8[7:0] and the sixteen-bit vector 58 is also referred to as Shr16[15:0]. These three vectors 54, 56, 58 form a three dimensional matrix 60 which contains 256 potential node locations 62 (also called cells and only a sampling of cells are identified by number in the Figures), one for every processor node 22 in the maximum size coherence domain of this example. As shown in FIG. 6, the three dimensional matrix 60 includes a top plane 64, a bottom plane 66, eight rows 68, and sixteen columns 70.

When a particular processor node 22 is a sharer, i.e., shares a line of memory, the corresponding bits in each of the three vectors 54, 56, 58 are set and the intersections of the set bits in the three dimensional matrix 60 are assumed to be sharers even though there are sometimes nodes 22 indicated which are aliases, i.e., not sharers, because of the compression involved in representing 256 nodes in twenty-six bits.

As shown in FIGS. 5 and 6, when the maximum 256 nodes 22 are present in this example, the bit set for the two-bit vector 54 is determined from a physical processor number N (also referred to as the node number) by a 1-to-2 decode of bit N[7] of the node number N and represents the plane, i.e., top 64 or bottom 66 of the three-dimensional matrix 60. The eight-bit vector 56 is determined by a 3-to-8 decode of bits N[6:4] of the node number N and represents the row 68 in the matrix 60. The sixteen-bit vector 58 is determined by a 4-to-16 decode of bits N[3:0] of the node number N and represents the column 70 in the matrix 60.

Figure 7:
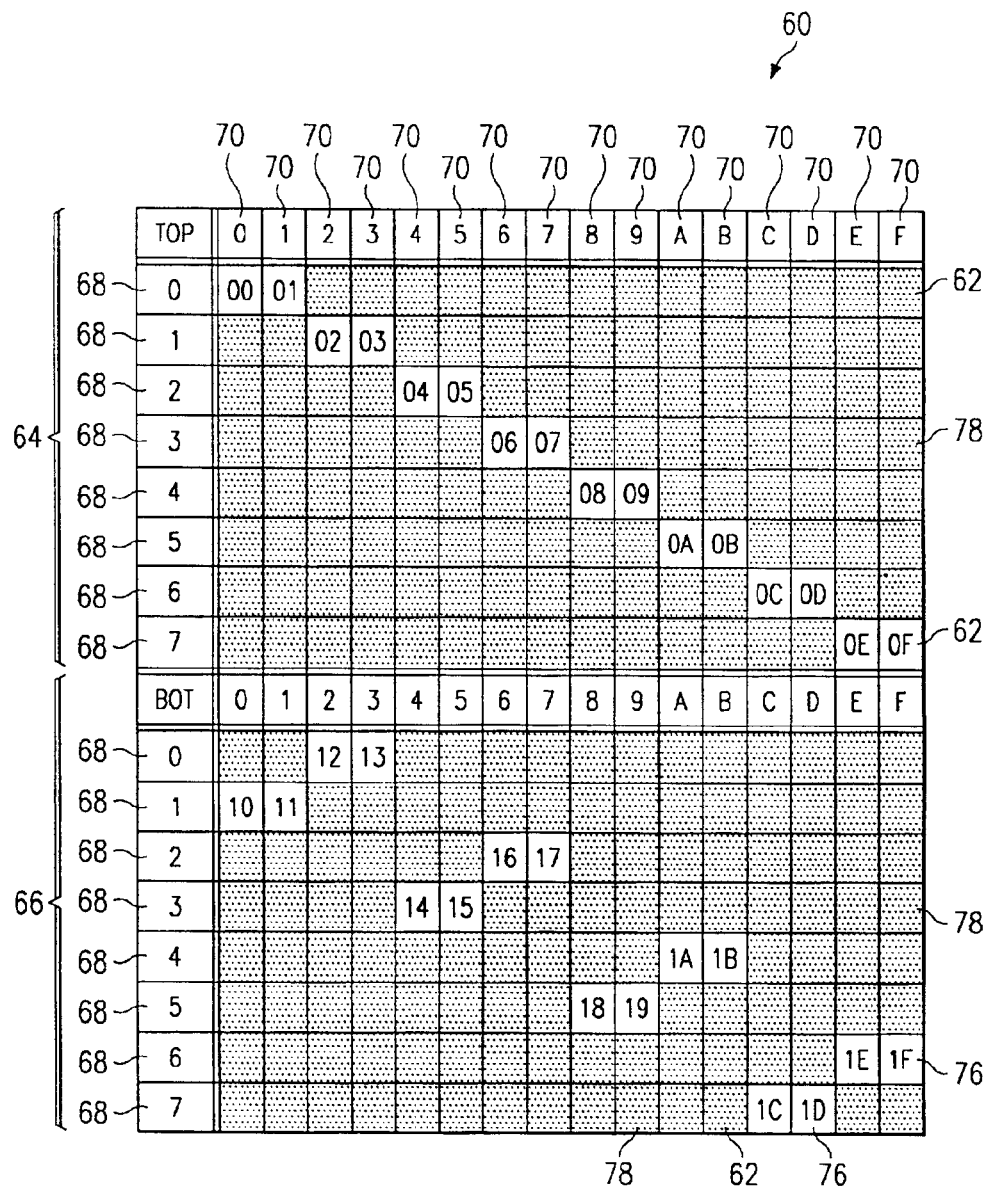
FIG. 7 is a matrix illustrating the location of nodes in a 32 node system which can be used according to the present invention.
Figure 8:
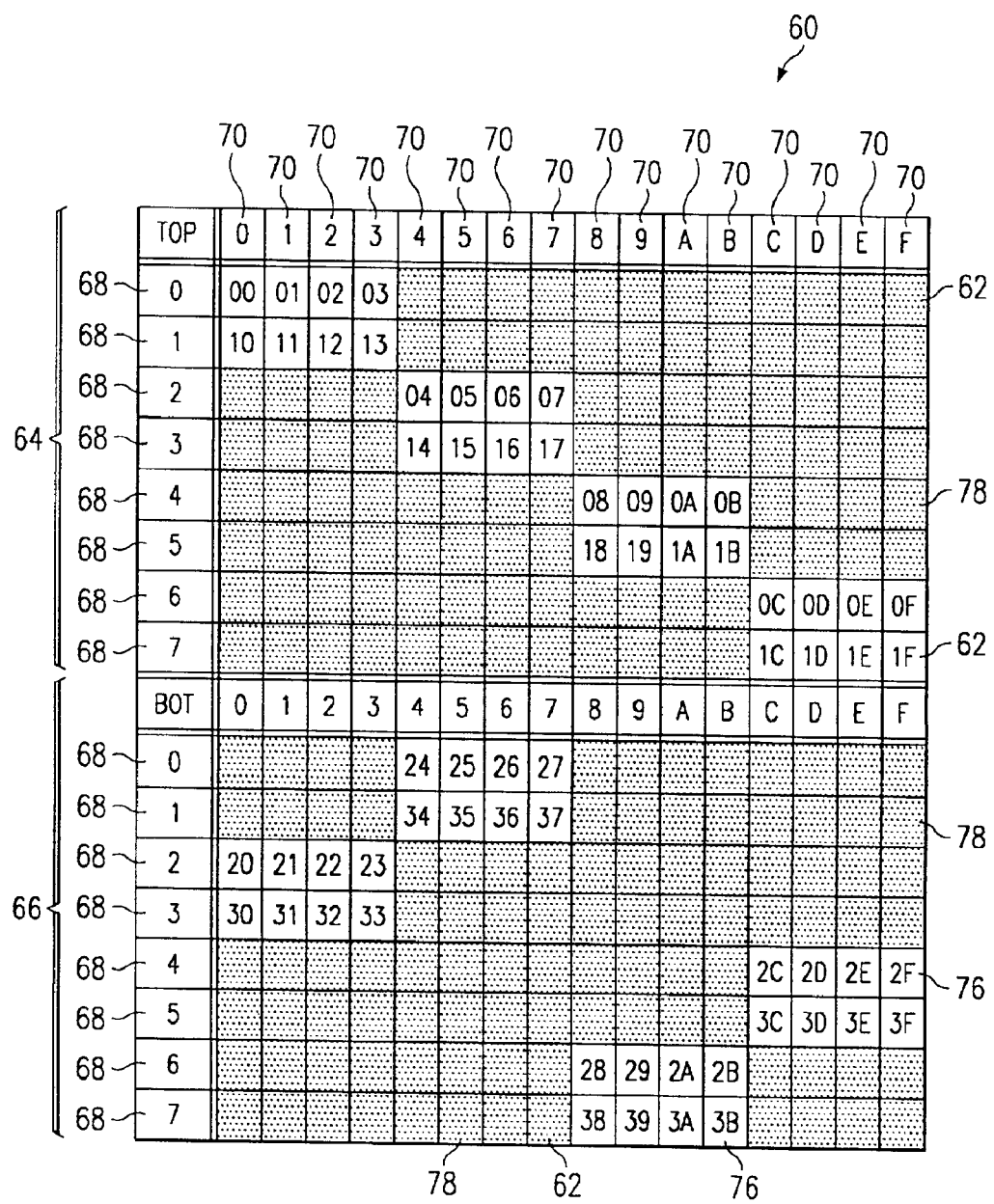
FIG. 8 is a matrix illustrating the location of nodes in a 64 node system which can be used according to the present invention.
Figure 9:
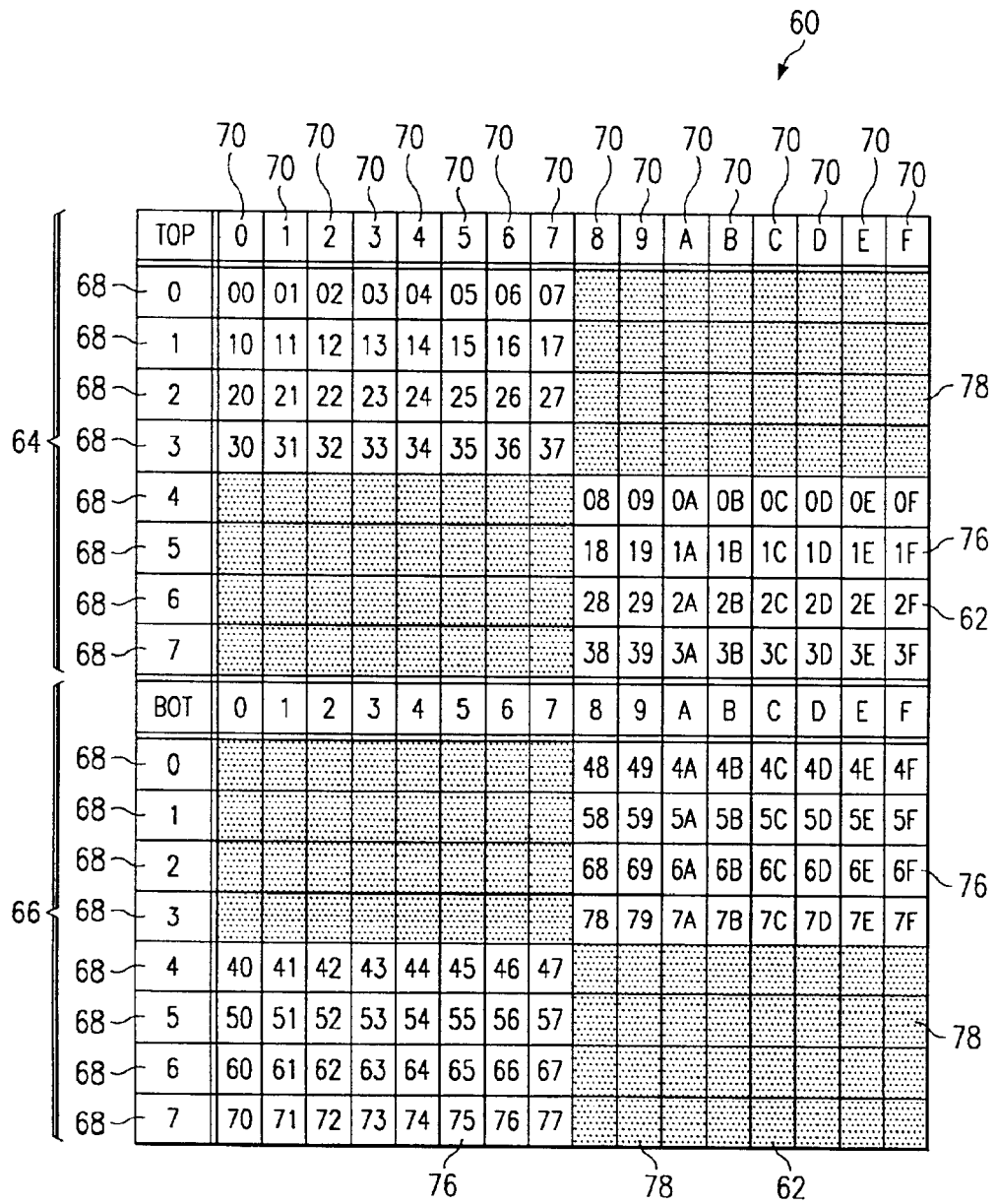
FIG. 9 is a matrix illustrating the location of nodes in a 128 node system which can be used according to the present invention.
Figures 10, 11, 12, 13:
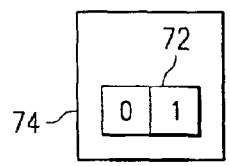
FIG. 10 illustrates an embodiment of a Sharing Mode which can be used in accordance with the present invention.
FIG. 11 is a table illustrating an example of decoding which can be used in accordance with the present invention.
FIG. 12 is a table illustrating an example of decoding used in Sharing Mode 11.
FIG. 13 is a table illustrating an example of decoding used in Sharing Mode 10.

As shown in FIGS. 7–9, when fewer actual nodes 22 exist in the multi-processor system 20 than the maximum possible number of nodes, i.e., in this example, less than 256 nodes, the rules for decoding the node number N into the bit vectors 54, 56, 58 are changed somewhat to reduce the number of extraneous invalidates by dispersing the actual node locations among the potential node locations 62 in a noncontiguous way, i.e., positioning the actual node locations less densely. For example, as shown in FIG. 10, a two-bit mode field 72, called "Sharing Mode" in a configuration register 74 takes the following values depending on the number of actual nodes in the multiprocessor system 20:

00=32 nodes or fewer
01=33 to 64 nodes
10=65 to 128 nodes
11=129 to 256 nodes

For the node number N[7:0], the following rules apply for selecting the plane 64 or 66 for each of the below listed Sharing Modes:

00: DE[25:24]=decode(N[4])
01: DE[25:24]=decode(N[5])
10: DE[25:24]=decode(N[6])
11: DE[25:24]=decode(N[7])

In other words, for example, in Sharing Mode 00, N[4] represents the top 64 or bottom 66 of the plane, depending on whether N[4] is set to one.

For the node number N[7:0], the following rules apply for selecting the row 68 for each of the below listed Sharing Modes:

00: DE[23:20,11:8]=decode(N[3], N[2], (N[4]xorN[1]))
01: DE[23:20,11:8]=decode(N[3], (N[5]xorN[2]), N[4])
10: DE[23:20,11:8]=decode(N[6]xorN[3]), N[5], N[4])
11: DE[23:20,11:8]=decode(N[6:4])

For the node number N[7:0], the following rule applies for selecting the column 70 for all four of the Sharing Modes:

DE[19:12,7:0]=decode(N[3:0])

The system is simple, can be implemented at low latency (AND gate followed by XOR gate), and provides better performance than the method of always using Sharing Mode=11. This does assume that all node numbers N are within the smallest possible power of two range beginning at zero. If this is not the case, the larger mode size must be used.

As explained above, FIGS. 6–9 illustrate all the potential node locations 62 in table format having two planes (the top 64 and bottom 66 halves of the matrix 60) and eight rows 68 of sixteen columns 70 in each plane. FIGS. 6–9 illustrate numbered locations 76 which potentially represent actual nodes 22. FIGS. 7–9 show shaded locations 78 which are empty, i.e., those locations do not represent actual nodes 22. However, many of the numbered locations 76 may also be empty if there are not enough nodes 22 with processors 30 to fill them. An actual node location is a numbered location 76 that is not empty.

It is permissible to use a larger configuration than necessary, i.e., 44 nodes in the 65 to 128 configuration, although that will probably produce a greater number of unnecessary invalidates than using the smallest configuration possible. In FIGS. 6 through 9, the horizontal position of location 62, i.e., the column 70, is determined by Shr16. In FIGS. 6 through 9, the 0 bit is on the left (in Shr16 and in the Directory Entry (DE 50), the 0 bit is on the right). The vertical position is determined with respect to the plane by being part of the top plane 64 if DE[24] is set and part of the bottom (BOT) plane 66 if DE[25] is set. The vertical position is determined with respect to row 68 by Shr8. The 0 bit for vertical position is on the top (in Shr8 and in the Directory Entry (DE 50), the 0 bit is on the right).

FIG. 7 shows the location of nodes 22 in the three dimensional matrix 60 for thirty-two nodes 22 or fewer (Sharing Mode=00) where the vector fields are N[4] for plane 64 or 66; N[3], N[2], (N[4]xorN[1]) for row 68; and N[3:0] for column 70. There is no need for a smaller mode in this embodiment because up to sixteen nodes inherently have no aliasing and this property is maintained here. When the actual number of processor nodes 22 is between 17 and 32, there is no aliasing as long as nodes 0–15 are not used on the same user code as nodes 16–31. But both of these properties would be true if only Sharing Mode=11 were supported.

The advantage of Sharing Mode=00 is demonstrated where two nodes 22 share a line, one in the 0–15 range and the other in the 16–31 range. Unless they differ by exactly sixteen, the two nodes 22 will create two additional aliases with Sharing Mode=11. For example, in FIG. 6, when two nodes 22 share a line and the nodes are at the "00" and "19" locations 62, aliases are at the "10" and "09" locations in view of the additional intersections of the rows 68 and columns 70. With Sharing Mode=00, however, only particular pairs—those with bits 4 and 0 (i.e., N[4] and N[0] inverted), will cause aliases. In other words, while the "00" and "11" locations 62 in FIG. 7 will create additional aliases at the "01" and "10" locations, the "00" and "19" locations will not create additional aliases at the "09" and "10" locations. Therefore, subject to the above restrictions, out of 256 pairings, 240 will cause aliases with Sharing Mode=11 and only sixteen will cause aliases with Sharing Mode=00. Note that in FIG. 7 the "00" and "01" numbered locations 76 are contiguous to each other but not to any other numbered location. This is true for each of the sixteen pairs of adjacent numbered locations 76 in FIG. 7. Thus the numbered locations 76 in FIG. 7 are at least partially noncontiguous.

Broadening to all possible pairings, there are 496 combinations of two nodes possible with 32 nodes. The numbers are still the same because no sharing which does not cross the boundary between 15 and 16 will cause aliasing in either scheme. There are 240 pairings or 48% which cause aliases with Sharing Mode=11 and only sixteen pairings or 3% which cause aliases with Sharing Mode=00. Similar but smaller benefits exist for more than two nodes.

FIG. 8 shows the numbered locations 76 of nodes 22 in the three dimensional matrix 60 for 33 to 64 nodes where the vector fields are N(S) for plane 64 or 66; N[3],(N[5]xorN[2]), N[4] for row 68; and N[3.0] for column 70. For the case of 64 nodes, there are 2016 possible pairings. Of these, 1440 or 71% cause aliasing with Sharing Mode=11 and only 416 or 21% causing aliasing with Sharing Mode=01.

FIG. 9 illustrates the numbered locations 76 of nodes 22 in the three dimensional matrix 60 for 65 to 128 nodes where the vector fields are N[6] for plane 64 or 66; (N[6]xorN[3]), N[5], N[4] for row 68; and N[3:0] for column 70. For the case of 128 nodes, there are 8128 possible pairings. Of these, 6720 or 83% cause aliasing with Sharing Mode=11 and only 2336 or 29% cause aliasing with Sharing Mode=10.

As described above, FIG. 6 shows the numbered locations 76 of nodes 22 in the three dimensional matrix 60 for 129 to 256 nodes where the vector field is N[7] for plane 64 or 66; N[6:4] for row 68; and N[3:0] for column 70.

The following is an example of a sixty-eight node system with a line shared by two nodes—a first node at the "00" location 62 and a second node at the "19" location 62. Using hexadecimal notation, the "00" and "19" nodes are shown in FIG. 11 in addition to showing the corresponding bit settings for the node number N where positions N[0:3] are used for the least significant bit and positions N[4:6] are used for the second least significant bit of the node number N.

Using Sharing Mode 11, effectively, is the default mode in a three dimensional matrix 60 that did not seek to minimize the number of spurious invalid messages when fewer actual nodes exist than the maximum possible number of nodes for the multi-processor system 20. Using Sharing Mode 11 for comparison, FIGS. 6 and 12 show that the "0" node is located on the three dimensional matrix 60 in the top plane 64 (N[7]=0), the "0" row (N[6:4]=0, 0, 0) and the "0" column (N[3:0]=0, 0, 0, 0), i.e., the "00" numbered location 76. The "19" node is located on the three dimensional matrix 60 in FIG. 6 in the top plane 64 (N[7]=0), the "1" row (N[6:4]=0, 0, 1) and the "9" column (N[3:0]=1, 0, 0, 1), i.e., the "19" numbered location 76 in FIG. 6. As illustrated in FIG. 6, using hexadecimal notations the sharers are at $0_x00$ and $0_x19$. However, FIG. 6 also illustrates that aliases are at $0_x09$ and $0_x10$ because nodes potentially exist at the "0" row, "9" column and the "1" row, "0" column, which are also intersections, both on the top plane 64, when the "0" and "19" nodes share a line.

Using Sharing Mode 10, as shown in FIGS. 9 and 13, the "0" node is located on the three dimensional matrix 60 in FIG. 9 in the top plane (N[6]=0), the "0" row (N[6]xorN[3], N[5], N[4]=0, 0, 0) and the "0" column (N[3:0]=0, 0, 0, 0), i.e., the "00" numbered location 76. The "19" node is located on the three dimensional matrix 60 in FIG. 9 at the "0" plane (N[6]=0), the "5" row (N[6]xorN[3], N[5], N[4]=1, 0, 1) and the "9" column (N[3:0]=1, 0, 0, 1), i.e., the "19" numbered location 76 in FIG. 9.

For the "19" node, Sharing Mode 11, mapped to the "1" row while Sharing Mode 10 mapped to the "5" row. This results from the different rules for decoding the row (i.e., using (N[6]xorN[3]), N[5], N[4] as opposed to N[6], n[5], n[4]). As illustrated in FIG. 9, the sharers are still at $0_x00$ and $0_x19$. However, FIG. 9 also illustrates that no aliases exist in Sharing Mode 10 because while the intersection of the "0" row and the "0" column 0 has the "00" numbered location 76, i.e., it represents a node, and the intersection of the "5" row and the "9" column has the "19" numbered location 76, the intersection of the "0" row and "9" column does not have a numbered location 76 and the intersection of the "5" row and the "0" column does not have a numbered location 76, both of these latter intersections having shaded locations 78 in FIG. 9 which are empty.

Another way of considering the issue is to note that in Sharing Mode 10, for a node 22 to exist in the "0" row, N[3] must be "0", but for a node to exist in the "9" column N[3] must be "1". The system 20 knows that N[3] cannot be at two different states simultaneously. Thus the system 20 recognizes that no node 22 exists at that intersection. Accordingly, the system 20 does not need to send a spurious invalidation message to that shaded location 78. Similarly, the system 20 recognizes that a node 22 does not exist at the "5" row, "10" column, which would also require N[3] to be both "0" and "1" simultaneously.

As can be seen from the above example, more efficient use of a multi-dimensional sharing vector can be realized, when fewer than the maximum number of nodes 22 are available by strategically dispersing actual node locations. The numbered locations 76 represent actual nodes 22, throughout the three dimensional matrix 60 (i.e., at least some of the actual node locations are not contiguous by row, column or plane, as exemplified by comparing "00" through "1F" numbered locations in FIG. 7 versus FIG. 6). The locations also relate the plane 64 or 66, row 68 and/or column 70 coordinates to each other including by use, in the above example, of XOR gates in the 8-to-26 bit decoding. In the above example, because N[3] was used to determine both the row 68 and the column 70 for each actual node sharing the line, the inconsistent value of N[3] for the alias intersection was recognizable to the multi-processor system 20.

Thus, it is apparent that there has been provided, in accordance with the present invention, a method and system for enhancing the efficiency of a multi-dimensional sharing vector in a computer system that satisfies the advantages set forth above. Although the present invention has been described in detail, it should be understood that various changes, substitutions, and alterations may be readily ascertainable by those skilled in the art and may be made herein without departing from the spirit and scope of the present invention as defined by the following claims

What is claimed is:

1. A multiprocessor computer system comprising:
   a plurality of processor nodes;
   a memory, wherein the memory includes a plurality of lines and a cache coherence directory structure, wherein the plurality of lines includes a first line and wherein the cache coherence directory structure includes a plurality of directory structure entries; and
   an interconnect network connecting the plurality of processor nodes to the memory;
   wherein each directory structure entry includes processor pointer information indicating the processor nodes that have cached copies of the first line, wherein the processor pointer information includes a plurality n of bit vectors, where n is an integer greater than one;
   wherein the n bit vectors define a matrix having a number of locations equal to the product of the number of bits in each of the n bit vectors, wherein the number of locations is at least equal to the number of processor nodes and wherein each of the processor nodes is mapped to a corresponding one of the locations wherein the locations corresponding to the processor nodes are dispersed in the matrix in an at least partially noncontiguous manner.

2. The multiprocessor computer system according to claim 1, wherein each of the processor nodes is assigned a corresponding processor number, wherein each processor number is expressed as n sets of bits, wherein the n sets of bits do not overlap.

3. The multiprocessor computer system according to claim 2, wherein each processor node includes a plurality of processors.

4. The multiprocessor computer system according to claim 1, wherein each processor node is assigned a processor number, wherein the processor number is expressed as a function of a first and a second set of bits; and
   wherein the n bit vectors include a first and a second bit vector, wherein the first set of bits are mapped into the first bit vector and wherein the second bit vector is a function of at least a subset of the first set of bits of the processor number and at least a subset of the second set of bits.

5. The multiprocessor computer system according to claim 4, wherein the n bit vectors include a third bit vector which is a function of at least a subset of the second set of bits of the processor number.

6. The multiprocessor computer system according to claim 5, wherein at least one bit of the second bit vector is a function of a bit from the third bit vector and a bit from the first bit vector.

7. The multiprocessor computer system according to claim 6, wherein the bit of the second bit vector is determined by an exclusive or (XOR) operation of the bit from the third bit vector and the bit from the first bit vector.

8. The multiprocessor computer system according to claim 6, further comprising a bit mode field configured to set a functional relationship between the bits of the processor node number and the bits of the n bit vectors.

9. A multiprocessor computer system comprising:
   a plurality of processor nodes;
   a memory, wherein the memory includes a plurality of lines and a cache coherence directory structure, wherein the plurality of lines includes a first line and wherein the cache coherence directory structure includes a plurality of directory structure entries; and
   an interconnect network connecting the plurality of processor nodes to the memory;
   wherein each of the processor nodes is assigned a corresponding processor number, wherein the processor number is defined by a four bit N0, N1, N2, N3 subfield of a seven bit field and a three bit N4, N5, N6 subfield of the seven bit field, where the four and three bit subfields do not overlap and where the bits are ordered such that N0 is a least significant bit and N6 is a most significant bit of the seven bit field;
   wherein each directory structure entry includes processor pointer information indicating the processor nodes that have cached copies of the first line, wherein the processor pointer information includes a first bit vector which includes sixteen bits, a second bit vector which includes eight bits and a third bit vector which includes two bits;

wherein the first bit vector is determined from bits N0, N1, N2 and N3;

wherein when the number of processor nodes is between one and thirty-two, the second bit vector is determined from N3, N2, and the result of an XOR operation between N4 and N1, and the third bit vector is determined from N4;

wherein when the number of processor nodes is between thirty-three and sixty-four, the second bit vector is determined from N3, the result of an XOR operation between N5 and N2, and N4, and the third bit vector is determined from N5;

wherein when the number of processor nodes is between sixty-five and 128, the second bit vector is determined from the result of an XOR operation between N6 and N3, N5, and N4, and the third bit vector is determined from N6;

wherein when the number of processor nodes is between 129 and 256, the processor number is defined by an eight bit field which includes the seven bit field and an additional bit N7, the second bit vector is determined from N6, N5 and N4, and the third bit vector is determined from N7.

10. The multiprocessor computer system according to claim 9 further comprising a sharing mode field configured to define a range of the number of processor nodes, wherein a first range has between one and thirty-two processor nodes, a second range has between thirty-three and sixty-four processor nodes, a third range has between sixty-five and 128 processor nodes and a fourth range has between 129 and 256 processor nodes.

11. A method of maintaining cache coherency across a computer system having a plurality of processor nodes, including a first and a second processor node, wherein each of the plurality of processor nodes includes a cache, the method comprising the steps of:

assigning a processor number to each of the plurality of processor nodes;

defining a plurality of bit vectors, wherein each processor node is represented by a bit in each of the plurality of bit vectors;

defining a matrix from the plurality of bit vectors wherein the matrix has a plurality of potential node locations and wherein the number of potential node locations is greater than the number of processor nodes;

mapping each processor number to a corresponding potential node location defining an actual node location wherein the actual node locations corresponding to the processor numbers are dispersed in the matrix in an at least partially noncontiguous manner;

determining a first memory location in memory;

reading a line from the first memory location into the cache of said first processor node, wherein the step of reading includes the step of setting a bit in each of the plurality of bit vectors as a function of the processor number assigned to the first processor node defining a first actual node location of the actual node locations;

reading a line from the first memory location into the cache of said second processor node, wherein the step of reading includes the step of setting a bit in each of the plurality of bit vectors as a function of the processor number assigned to the second processor node defining a second actual node location of the actual node locations; and writing to said first memory location, wherein the step of writing includes the steps of:
(a) determining, as a function of bits set in the bit vectors, which processor nodes hold a copy of the line from the first memory location; and
(b) sending a message to those processor nodes determined in step (a) indicating that the line read from the first memory location is no longer valid.

12. The method of maintaining cache coherency across a computer system according to claim 11 wherein the step of mapping further comprises:

mapping a first set of bits from the processor number into a first bit vector of the plurality of bit vectors; and mapping at least a subset of the first set of bits from the processor number and at least a subset from a second set of bits from the processor number into a second bit vector of the plurality of bit vectors.

13. The method of maintaining cache coherency across a computer system according to claim 12 wherein the step of mapping further comprises determining at least one bit of the second bit vector as a function of a bit from the third bit vector and a bit from the first bit vector.

14. The method of maintaining cache coherency across a computer system according to claim 13 wherein the step of mapping further comprises mapping a first set of bits from the processor number into a first bit vector of the plurality of bit vectors.

15. The method of maintaining cache coherency across a computer system according to claim 14 wherein the step of determining further comprises determining the bit of the second bit vector by an exclusive or (XOR) operation of the bit from the third bit vector and the bit from the first bit vector.

16. The method of maintaining cache coherency across a computer system according to claim 15 further comprising setting a functional relationship between the bits of the processor number and the bits of the plurality of the bit vectors based on the number of processor nodes in the computer system.

17. The method of maintaining cache coherency across a computer system according to claim 16 wherein the first bit vector is an N-to-$2^N$ mapping of the N least significant bits of the processor number.

18. The method of maintaining cache coherency across a computer system according to claim 17 wherein the second bit vector is an M-to-$2^M$ mapping of bits (M+N−1) through N of the processor number.

19. The method of maintaining cache coherency across a computer system according to claim 18 wherein the third bit vector is a P-to-$2^P$ mapping of bits (P+M+N−1) through M+N of the processor number.

20. The method of maintaining cache coherency across a computer system according to claim 19 wherein M=4, N=3 and P=2;

wherein the processor number is defined by an eight bit number N0, N1, N2, N3, N4, N5, N6, and N7;

wherein the first bit vector is defined by bits N0, N1, N2 and N3;

wherein when the number of processor nodes is between one and thirty-two, the second bit vector is defined by N3, N2 and the result of an XOR operation between N4 and N1; and the third bit vector is defined by N4;

wherein when the number of processor nodes is between thirty-three and sixty-four, the second bit vector is defined by N3, the result of an XOR operation between N5 and N2, and N4, and the third bit vector is defined by N5;

wherein when the number of processor nodes is between sixty-five and 128, the second bit vector is defined by the result of an XOR operation between N6 and N3, N5, and N4, and the third bit vector is defined by N6;

wherein when the number of processor nodes is between 129 and 256, the processor number is defined by an eight bit field which includes the seven bit field and an additional bit N7, the second bit vector is defined by N6, N5 and N4, and the third bit vector is defined by N7.

* * * * *